United States Patent
Zhou

(10) Patent No.: US 11,248,990 B2
(45) Date of Patent: Feb. 15, 2022

(54) MONITORING TERMINAL, ROBOT, AND PRODUCT TESTING METHOD

(71) Applicant: HONGFUJIN PRECISION ELECTRONICS (TIANJIN) CO., LTD., Tianjin (CN)

(72) Inventor: Song Zhou, TianJin (CN)

(73) Assignee: HONGFUJIN PRECISION ELECTRONICS (TIANJIN) CO., LTD., Tianjin (CN)

(*) Notice: Subject to any disclaimer, the term of this patent is extended or adjusted under 35 U.S.C. 154(b) by 329 days.

(21) Appl. No.: 16/508,397

(22) Filed: Jul. 11, 2019

(65) Prior Publication Data

US 2020/0033231 A1  Jan. 30, 2020

(30) Foreign Application Priority Data

Jul. 25, 2018 (CN) .......................... 201810826394.4

(51) Int. Cl.
*G01M 99/00* (2011.01)

(52) U.S. Cl.
CPC . *G01M 99/008* (2013.01); *G05B 2219/45089* (2013.01); *G05B 2219/50391* (2013.01)

(58) Field of Classification Search
CPC ............ G01M 99/008; G05B 19/042; G05B 2219/45089; G05B 2219/50391; B25J 9/1679; B25J 9/1674; B25J 19/0095
See application file for complete search history.

(56) References Cited

U.S. PATENT DOCUMENTS 5,726,920 A * 3/1998 Chen .................. G01R 31/2831
324/73.1

FOREIGN PATENT DOCUMENTS

TW  201445268  12/2014
TW  201522989  6/2015

OTHER PUBLICATIONS

Google Search History, Jul. 2, 2021, 1 pp. (Year: 2021).*

* cited by examiner

*Primary Examiner* — Toan M Le
(74) *Attorney, Agent, or Firm* — ScienBiziP, P.C.

(57) ABSTRACT

A monitoring terminal in a manufacturing process which is able to detect and correct a faulty product-testing machine includes a communication module, a determining module, and a recording module. The communication module receives a test log transmitted from at least one product-testing machine communicating with the monitoring terminal. The test log includes identification of the product-testing machine and status thereof. The determining module can determine according to the test log whether the product-testing machine is faulty according to several conditions. The recording module records the identification of the machine in a fault information list when the machine is deemed faulty. A robot and a method for testing products and the product-testing machines themselves are also disclosed.

10 Claims, 2 Drawing Sheets

MONITORING TERMINAL, ROBOT, AND PRODUCT TESTING METHOD

FIELD

The subject matter herein generally relates to product-testing during manufacture.

BACKGROUND

Manufacturing requires testing of products, such as boards, before use. Products which pass the test can be used. When a product is test, the product is placed on a test machine by a robot and tested by the test machine. If the test machine is itself faulty, then even if the product is satisfactory, the product can be failed.

Therefore, there is room for improvement within the art.

BRIEF DESCRIPTION OF THE DRAWINGS

Implementations of the present technology will now be described, by way of embodiments with reference to the attached figures.

DETAILED DESCRIPTION

Figure 1:
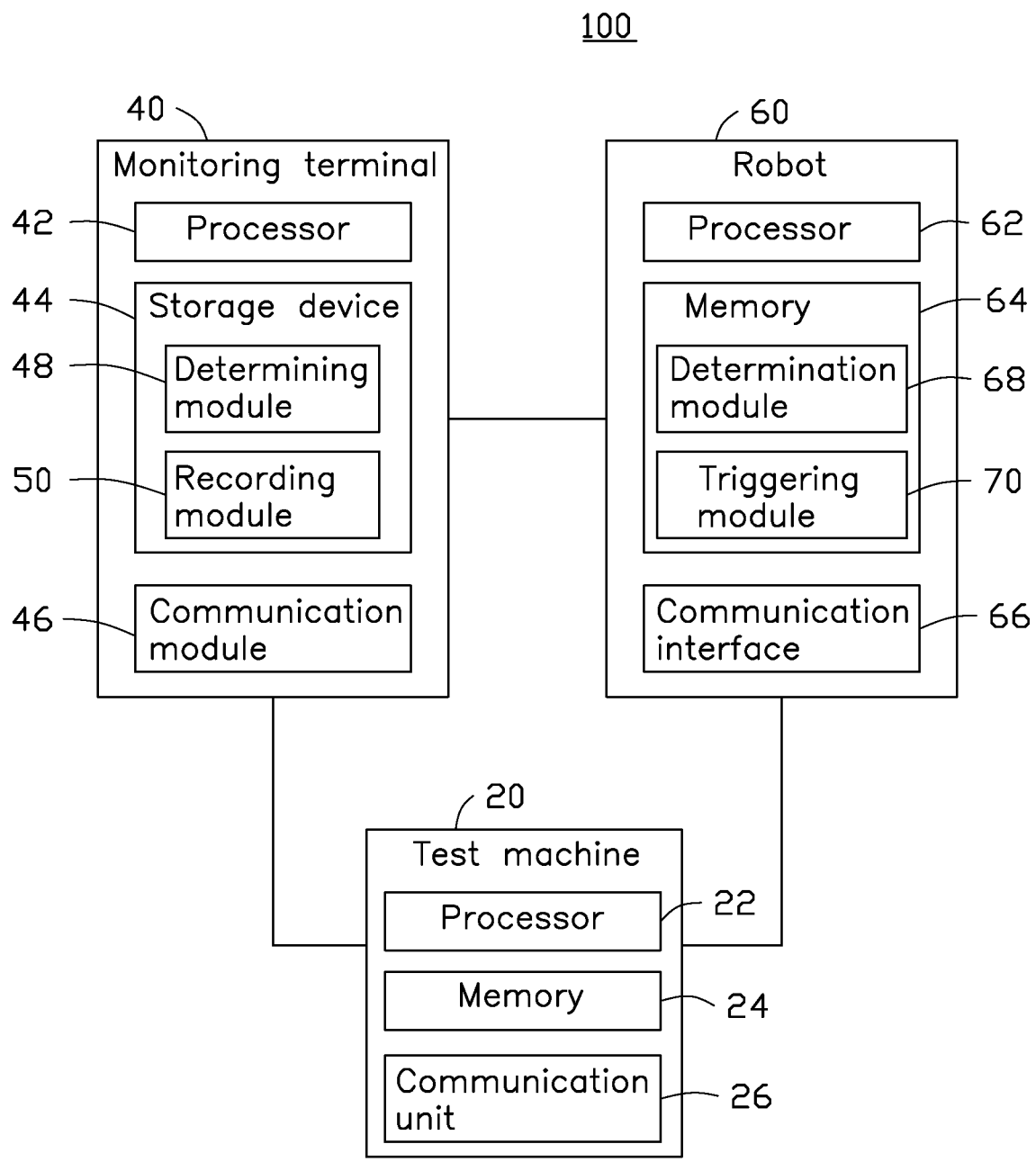
FIG. 1 is a block diagram of a product testing system, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a product testing system 100 according to an embodiment of the disclosure. The product placement system 100 is employed in a monitoring terminal 40 and a robot 60. The monitoring terminal 40 and the robot 60 can communicate with at least one test machine 20. The robot 60 communicates with the monitoring terminal 40. The product placement system 100 controls the robot 60 to place products for testing on the test machine 20. The test machine 20 tests the product.

The test machine 20 includes at least, but is not limited to, one processor 22, a memory 24, and a communication unit 26. The memory 24 stores data and programs. The communication unit 26 communicates with the monitoring terminal 40 and the robot 60.

The monitoring terminal 40 includes at least, but is not limited to, one processor 42, a storage device 44, and a communication module 46. The communication module 46 communicates with the test machine 20 and the robot 60.

The robot 60 includes at least, but is not limited to, one processor 62, a memory 64, and a communication interface 66. The communication interface 66 communicates with test machine 20 and monitoring terminal 40.

The communication unit 26 can send a test log to the monitoring terminal 40 according to a preset rule. The preset rule may be that the test log is sent to the monitoring terminal 40 when a product is tested. The test log includes identification of the test machine 20 and status of the test machine 20. The identification of the test machine 20 includes a machine number of the test machine 20. The status of the test machine 20 includes, but is not limited to, voltage supplied to the test machine 20, and information on whether the memory 24 can be read from or written to. The test log further includes information as to testing of the product. The information as to testing of the product includes whether the product is defective or passed.

The communication module 46 receives the test log. The product placement system 100 includes a determining module 48 and a recording module 50 stored in the storage device 44. The determining module 48 is configured to determine, according to the test log, whether the testing machine 20 is working normally or is faulty. For example, the test machine 20 is determined to be faulty according to the status information that the memory 24 cannot be read from or written to. The test machine 20 is also determined to be faulty if a number of products sequentially declared by the machine 20 to be failed products exceeds a preset numbers. The preset number of times can be five. The recording module 50 is configured to record the identification of the test machine 20 in a fault information list when the testing machine 20 is faulty. In another embodiment, the fault information list is stored in the memory 64 of the robot 60.

The test machine 20 is configured to transmit a test-complete signal to the robot 60. The test-complete signal includes identification of the test machine 20 that transmits the signal. Specifically, the test machine 20 transmits the test-complete signal to the robot 60 when the test of a product placed on the test machine 20 is completed.

The communication interface 66 receives the test-complete signal. The product placement system 100 further includes a determination module 68 and a triggering module 70. The determination module 68 and the triggering module 70 are stored in the memory 64. The determination module 68 determines whether the identification in the test-complete signal is recorded in the fault information list. The triggering module 70 is configured to trigger the test-complete signal when the identification in the signal is not recorded in the fault information list. When the identification in the signal is recorded in the fault information list, the trigger module 70 does not trigger the test-complete signal. When the signal is triggered, the robot 60 controls the robot 60 to move and place the next product on the transmitting test machine 20.

Figure 2:
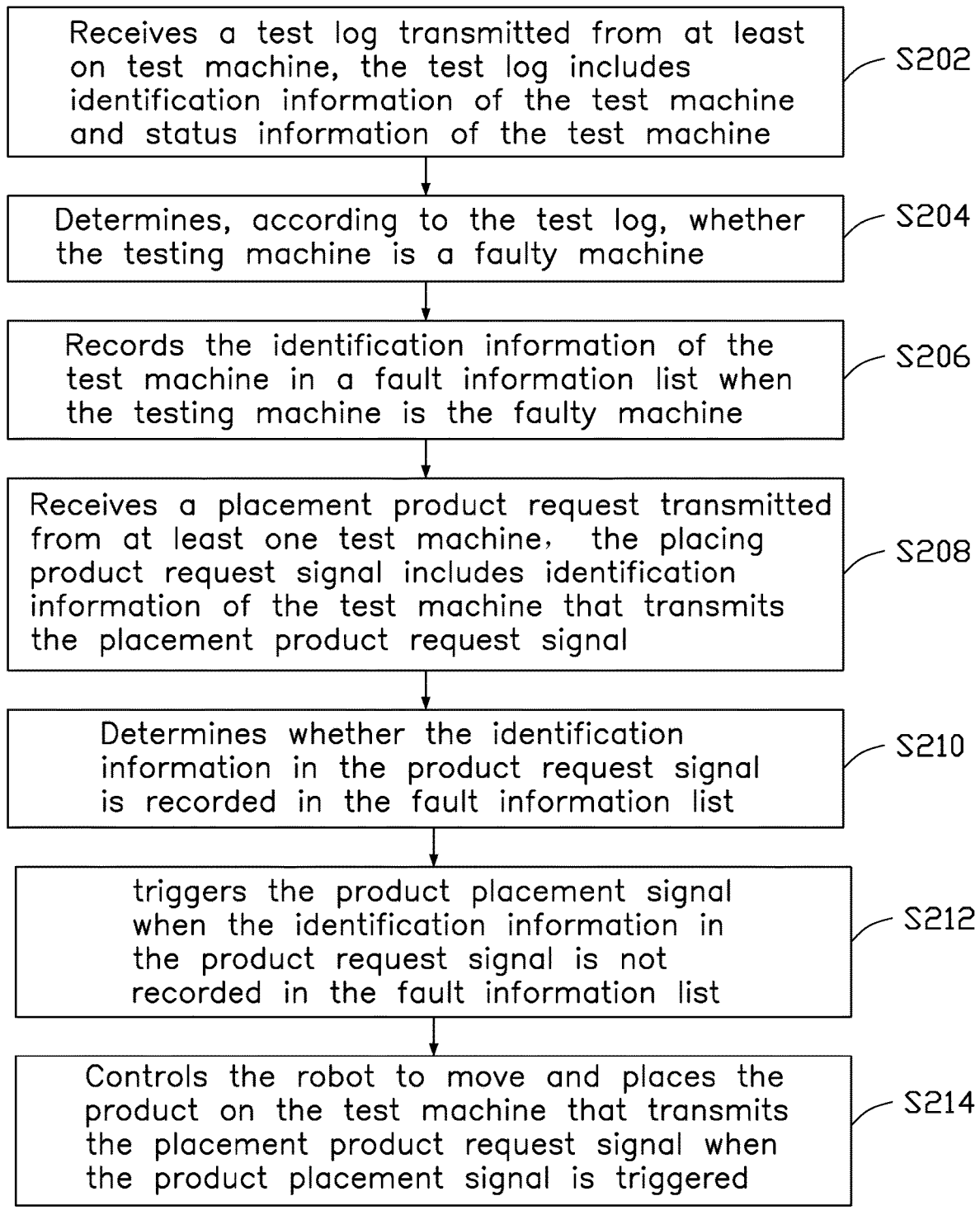
FIG. 2 is a flowchart of a product testing method, according to an exemplary embodiment.

FIG. 2 illustrates a flowchart of a product placement method. The example method is provided by way of example, as there are a variety of ways to carry out the method. Each block shown in FIG. 2 represents one or more processes, methods, or subroutines, carried out in the exemplary method. Additionally, the illustrated order of blocks is by example only and the order of the blocks can be changed according to the present disclosure. The exemplary method can begin at block 202. Depending on the embodiment, additional steps can be added, others removed, and the ordering of the steps can be changed.

At block 202, the monitoring terminal 40 receives a test log transmitted from at least one test machine 20. The test log includes identification of the test machine 20 and status of the test machine 20. The identification of the test machine 20 includes a machine number of the test machine 20.

At block 204, the determining module 48 determines, according to the test log, whether the testing machine 20 is a faulty machine. The test log also includes test information of the product. The test information of the product includes whether the product is a defective product. In an embodiment, when a number of times that the product is a defective product continuously measured by the test machine 20 exceeds a preset number of time, the determining module 48 determines that the test machine 20 is the faulty machine.

At block 206, the recording module 50 records the identification of the test machine 20 in a fault information list when the testing machine 20 is the faulty machine.

At block 208, the communication interface 66 receives a test-complete signal transmitted from at least one test machine 20. The test-complete signal includes identification of the test machine 20 that transmits the test-complete signal.

At block 210, the determination module 68 determines whether the identification in the test-complete signal is recorded in the fault information list.

At block 212, the triggering module 70 triggers the test-complete signal when the identification in the test-complete signal is not recorded in the fault information list.

At block 214, the robot 60 controls the robot 60 to move and places the next product on the test machine 20 that transmits the placement test-complete signal when the product placement signal is triggered.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A monitoring terminal comprising:
   a storage device that stores one or more programs; and
   at least one processor, wherein the one or more programs, when executed by the at least one processor, cause the at least one processor to:
   receive a test log transmitted from at least one test machine communicating with the monitoring terminal, the test log comprising identification of the test machine and status of the test machine, the test machine configured to test a product;
   determine, according to the test log, whether the testing machine is a faulty machine; and
   record the identification of the test machine in a fault information list when the testing machine is the faulty machine;
   wherein the test log further comprises information as to testing of the product, the test information of the product comprises whether the product is a defective or passed, the at least one processor is further caused to determines that the test machine is the faulty machine when a number of products continuously declared by the machine to be failed products exceeds a preset number.

2. The monitoring terminal of claim 1, wherein the identification of the test machine comprises a machine number of the test machine.

3. The monitoring terminal of claim 1, wherein the status of the test machine comprises voltage supplied of the test machine.

4. The monitoring terminal of claim 1, wherein the status of the test machine comprises information on whether a memory of the test machine can be read from or written to.

5. The monitoring terminal of claim 1, wherein the preset number of time is five.

6. A product testing method comprising:
   receiving a test log transmitted form at least one test machine communicating with a monitoring terminal, the test log comprising identification of the test machine and status of the test machine;
   determining, according to the test log, whether the testing machine is a faulty machine; and
   recording the identification of the test machine in a fault information list when the testing machine is the faulty machine;
   receiving a test-complete signal communication from the at least one test machine, a placing product request signal comprises identification of the test machine that transmits the test-complete signal;
   determining whether the identification in the product request signal is recorded in a fault information list;
   triggering a product placement signal when the identification in the product request signal is not recorded in the fault information list; and
   controlling a robot communicating with the monitoring terminal and the test machine to move and place the next product on the test machine that transmits the test-complete signal when the product placement signal is triggered;
   wherein the test log further comprises test information of the product, the test information of the product comprises whether the product is a defective product; when determining, according to the test log, whether the testing machine is a faulty machine comprising: determining that the test machine is the faulty machine when a number of times that the product is the defective product continuously measured by the test machine exceeds a preset number of time.

7. The product testing method of claim 6, wherein the dentification of the test machine comprises a machine number of the test machine.

8. The product testing method of claim 6, wherein the status of the test machine comprises voltage information of the test machine.

9. The product testing method of claim 6, wherein the status of the test machine comprises information on whether a memory of the test machine can be read or written.

10. The product testing method of claim 6, wherein the fault information list is stored in the monitoring terminal.

* * * * *